United States Patent
Okabe et al.

(10) Patent No.: US 10,157,399 B2
(45) Date of Patent: Dec. 18, 2018

(54) DEMAND AND SUPPLY ADJUSTMENT SYSTEM

(71) Applicant: Mitsubishi Electric Corporation, Chiyoda-ku (JP)

(72) Inventors: Kazuyuki Okabe, Tokyo (JP); Shinya Makino, Tokyo (JP); Hiroshi Kashiwara, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 246 days.

(21) Appl. No.: 14/397,249

(22) PCT Filed: May 13, 2013

(86) PCT No.: PCT/JP2013/063280
§ 371 (c)(1),
(2) Date: Oct. 27, 2014

(87) PCT Pub. No.: WO2013/179876
PCT Pub. Date: Dec. 5, 2013

(65) Prior Publication Data
US 2015/0081413 A1    Mar. 19, 2015

(30) Foreign Application Priority Data
May 28, 2012   (JP) ................................ 2012-120603

(51) Int. Cl.
*G06Q 30/02* (2012.01)
*G06Q 50/06* (2012.01)

(52) U.S. Cl.
CPC ..... *G06Q 30/0223* (2013.01); *G06Q 30/0206* (2013.01); *G06Q 30/0207* (2013.01); *G06Q 50/06* (2013.01)

(58) Field of Classification Search
CPC .............................. G06Q 30/00; G06Q 30/02
(Continued)

(56) References Cited

U.S. PATENT DOCUMENTS 5,481,140 A    1/1996 Maruyama et al.
6,774,506 B2    8/2004 Hashimoto et al.
(Continued)

FOREIGN PATENT DOCUMENTS

JP    5-284649    10/1993
JP    2002-135976    5/2002
(Continued)

OTHER PUBLICATIONS

International Search Report dated Jun. 18, 2013, in PCT/JP2013/063280, filed May 13, 2013.
(Continued)

*Primary Examiner* — Marilyn G Macasiano
(74) *Attorney, Agent, or Firm* — Oblon, McClelland, Maier & Neustadt, L.L.P.

(57) ABSTRACT

A supply and demand adjustment system capable of making supply and demand adjustment of energy while changing an incentive to consumers. The supply and demand adjustment system includes: a supply and demand adjustment device; supply and demand arbitration terminals; and a supply and demand arbitration device. The supply and demand arbitration device determines an incentive target value, makes a request to each of the consumers to reduce usage of the energy within a range of the incentive target value, summarizes a reducible energy amount responsive to this request and given from each of the consumers in replies through the supply and demand arbitration terminals, and transmits the summarized amount to the supply and demand adjustment device. The supply and demand adjustment device and the supply and demand arbitration device make the supply and demand adjustment dynamically while changing the incentive target value.

10 Claims, 14 Drawing Sheets

(58) Field of Classification Search
USPC .......................... 705/7.37; 307/31; 700/291
See application file for complete search history.

(56) References Cited

U.S. PATENT DOCUMENTS

| | | | |
|---|---|---|---|
| 8,200,370 | B2 | 6/2012 | Paik |
| 8,521,336 | B2 | 8/2013 | Paik |
| 2001/0025209 | A1* | 9/2001 | Fukui ................ G06Q 50/06 700/291 |
| 2008/0201180 | A1* | 8/2008 | Green ................ G06Q 10/06 705/7.37 |
| 2010/0145884 | A1 | 6/2010 | Paik |
| 2012/0326505 | A1* | 12/2012 | Otsuki ................ H02J 3/28 307/31 |

FOREIGN PATENT DOCUMENTS

| | | |
|---|---|---|
| JP | 2002-176729 | 6/2002 |
| JP | 2002-199584 | 7/2002 |
| JP | 2002-252924 | 9/2002 |
| JP | 2003-87969 | 3/2003 |
| JP | 2004-7856 | 1/2004 |
| JP | 2005-94891 | 4/2005 |
| JP | 2007-334523 | 12/2007 |
| JP | 2009-124885 | 6/2009 |
| JP | 2012-511300 | 5/2012 |
| WO | 2010/065197 A2 | 6/2010 |
| WO | 2010/065197 A3 | 6/2010 |

OTHER PUBLICATIONS

International Preliminary Report on Patentability and Written Opinion dated Dec. 11, 2014 in PCT/JP2013/063280 with English translation.
Office Action dated Jun. 30, 2015 in Japanese Patent Application No. 2014-518371 (with partial English translation).
Notification of Results of Substantive Examination issued in corresponding Indonesian Application No. P00 2014 07379, dated Nov. 2, 2017 (with English translation).

* cited by examiner

FIG. 2
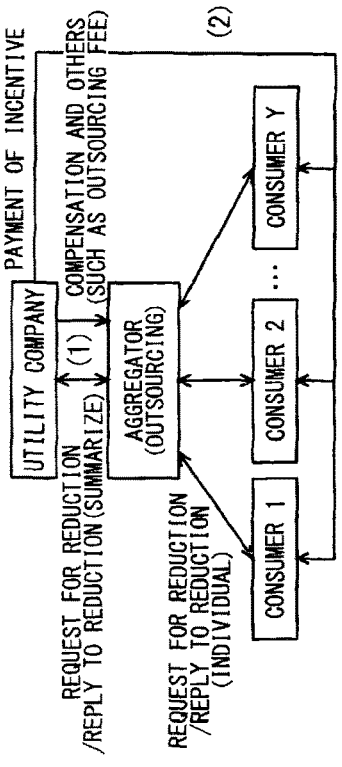
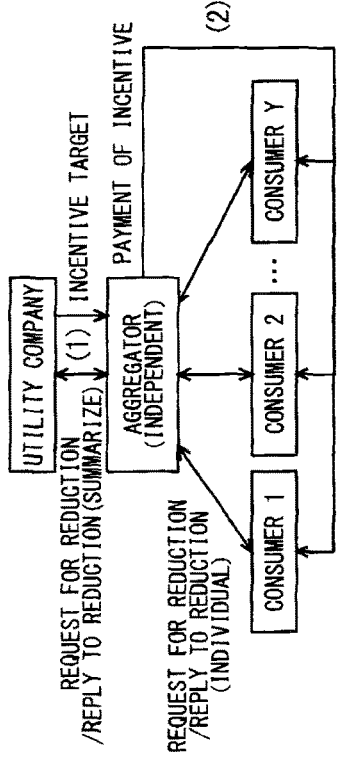

FIG. 3

| ITEM | | EXAMPLE OF SUPPLY AND DEMAND ADJUSTMENT BY INDEPENDENT AGGREGATOR | EXAMPLE OF SUPPLY AND DEMAND ADJUSTMENT BY OUTSOURCING AGGREGATOR |
|---|---|---|---|
| INCENTIVE D TO CONSUMER | TARGET | · DETERMINED DYNAMICALLY BY UTILITY COMPANY AND AGGREGATOR BASED ON WHOLESALE ENERGY MARKET PRICE | · DETERMINED DYNAMICALLY BY UTILITY COMPANY AND AGGREGATOR |
| | PAYMENT | · PAID FROM AGGREGATOR TO CONSUMER<br>· DETERMINED BASED ON CONTRACT BETWEEN AGGREGATOR AND CONSUMER | · PAID FROM UTILITY COMPANY TO CONSUMER<br>· DETERMINED BASED ON CONTRACT BETWEEN UTILITY COMPANY AND CONSUMER |
| POWER REDUCTION | | · ENERGY REDUCTION IS EXECUTED ON THE INITIATIVE OF AGGREGATOR | · ENERGY REDUCTION IS EXECUTED BY COOPERATION BETWEEN UTILITY COMPANY AND AGGREGATOR |
| | | Cs (INCENTIVE UPPER LIMIT)<br>Ct (INCENTIVE TARGET VALUE)<br>Cr (ACTUAL VALUE) = $\Sigma Cd_{(y)}$ \| Cs − Cr (VARIABLE) \|<br>Ca | Cs (INCENTIVE UPPER LIMIT) S<br>Ct (INCENTIVE TARGET VALUE)<br>Cr (ACTUAL VALUE) = $\Sigma Cd_{(y)}$ \| Cs − Cr (VARIABLE) \| S<br>Ca |
| SUPPLEMENTAL REMARKS | | · INCENTIVE TARGET (UPPER LIMIT (BUDGET)) : Cs  · INCENTIVE TARGET : Ct=Aa×Bt  (Bt<Ba)<br>· INCOME OF CONSUMER : Cd=Ad×Bd<br>· INCOME OF AGGREGATOR : Ca=S+(Cs−Cr)×E  (IN THE CASE OF INDEPENDENT AGGREGATOR, S=0 AND E=1)<br>   OUTSOURCING FEE TO BE PAID TO AGGREGATOR : S (IN THE CASE OF INDEPENDENT AGGREGATOR, S BASICALLY BECOMES 0<br>   FOR THE ABSENCE OF OUTSOURCING FEE)<br>   RATE OF COMPENSATION TO BE PAID TO AGGREGATOR : E → DETERMINED FOR EXAMPLE BY (a) ACCURACY OF ACHIEVEMENT OF<br>   PREVIOUS PREDICTION, (b) DIFFERENCE BETWEEN REDUCTION PLAN AND<br>   ACTUAL PERFORMANCE, AND (c) DISTRIBUTION TO UTILITY COMPANY<br>   (IN THE CASE OF INDEPENDENT AGGREGATOR, E BASICALLY BECOMES 1 AS<br>   DISTRIBUTION TO UTILITY COMPANY IS 0) | · PAYMENT OF INCENTIVE (ACTUALLY COLLECTED VALUE) : Cr= $\Sigma$ Cd(y)  (Cr<Ct) |

FIG. 7

| REDUCTION PLAN ID | REQUESTED REDUCTION AMOUNT $Aa+\Delta Aa$ | CUMULATIVE REDUCTION AMOUNT $\Sigma Ad(y)$ | TIME AND DATE OF EXECUTION OF REDUCTION | | | INCENTIVE TARGET UNIT PRICE Bt | ACTUAL INCENTIVE UNIT PRICE Br | INCENTIVE ADJUSTMENT RANGE R | | RATIO OF COMMITMENT | TIME AND DATE OF UPDATE |
|---|---|---|---|---|---|---|---|---|---|---|---|
| | | | DATE | STARTING TIME | ENDING TIME | | | MINIMUM | MAXIMUM | | |
| K0001 | 10000 | 6000 | 2012/5/3 | 18:00 | 22:00 | 30 | — | 5 | 30 | 20 | 2012/02/25 3:00 |
| K0001 | 10000 | 8000 | 2012/5/3 | 18:00 | 22:00 | 35 | — | 30 | 35 | 30 | 2012/02/26 3:00 |
| K0001 | 10000 | 11000 | 2012/5/3 | 18:00 | 22:00 | 40 | 38 | 35 | 40 | 40 | 2012/02/27 3:00 |
| K0002 | 5000 | 4000 | 2012/5/4 | 18:00 | 22:00 | 20 | — | 5 | 20 | 50 | 2012/03/2 3:00 |
| K0002 | 5000 | 5100 | 2012/5/4 | 18:00 | 22:00 | 24 | 21 | 5 | 20 | 55 | 2012/03/4 3:00 |
| K0001 | 12000 | 11500 | 2012/5/3 | 18:00 | 22:00 | 45 | — | 40 | 45 | 40 | 2012/05/2 12:00 |
| K0001 | 12000 | 12100 | 2012/5/3 | 18:00 | 22:00 | 48 | 47 | 45 | 48 | 45 | 2012/05/3 12:00 |
| ... | ... | ... | ... | ... | ... | ... | ... | ... | ... | ... | ... |

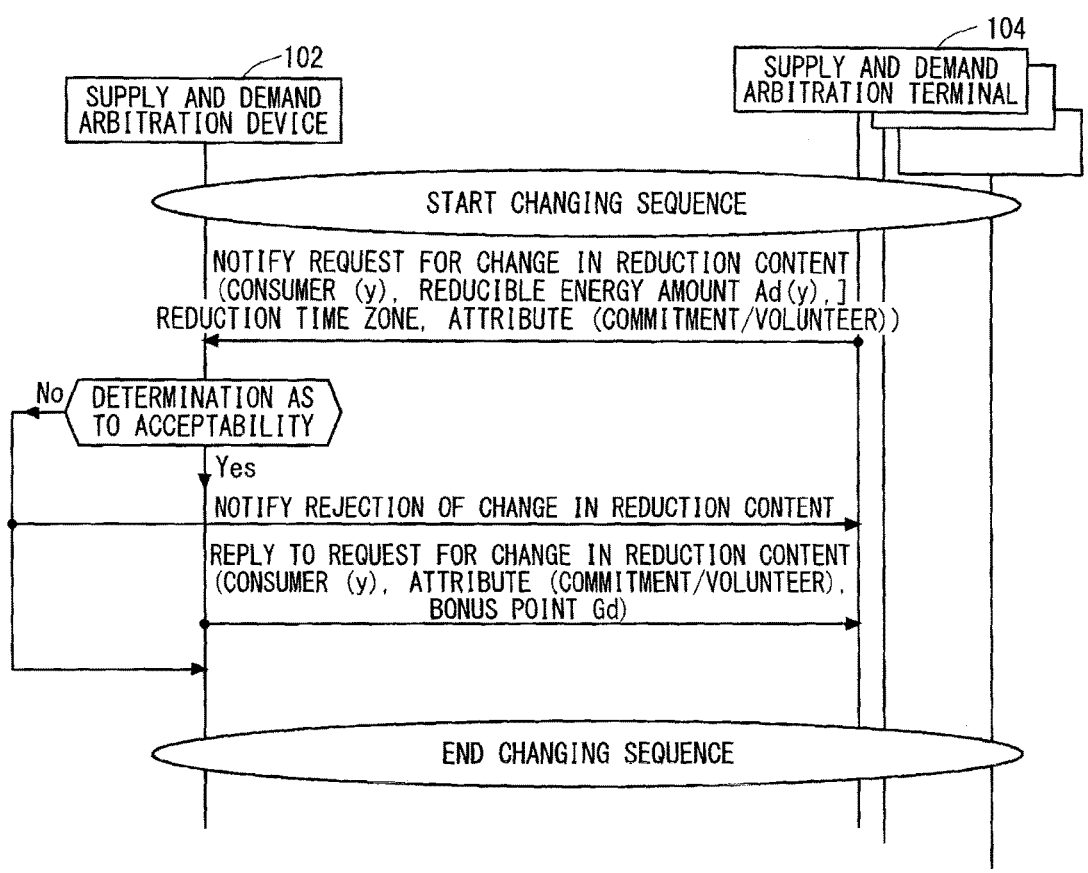

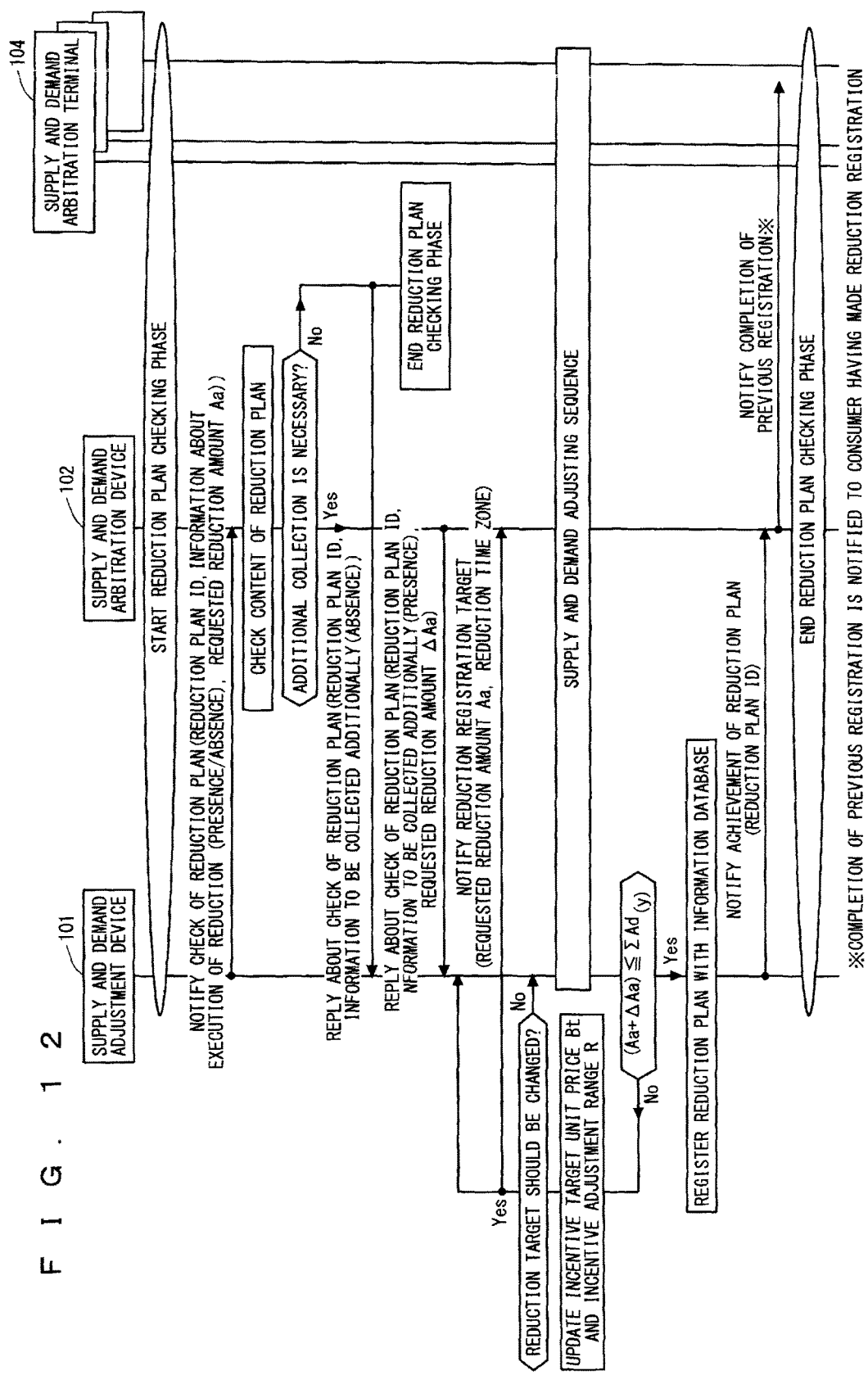

F I G. 1 3
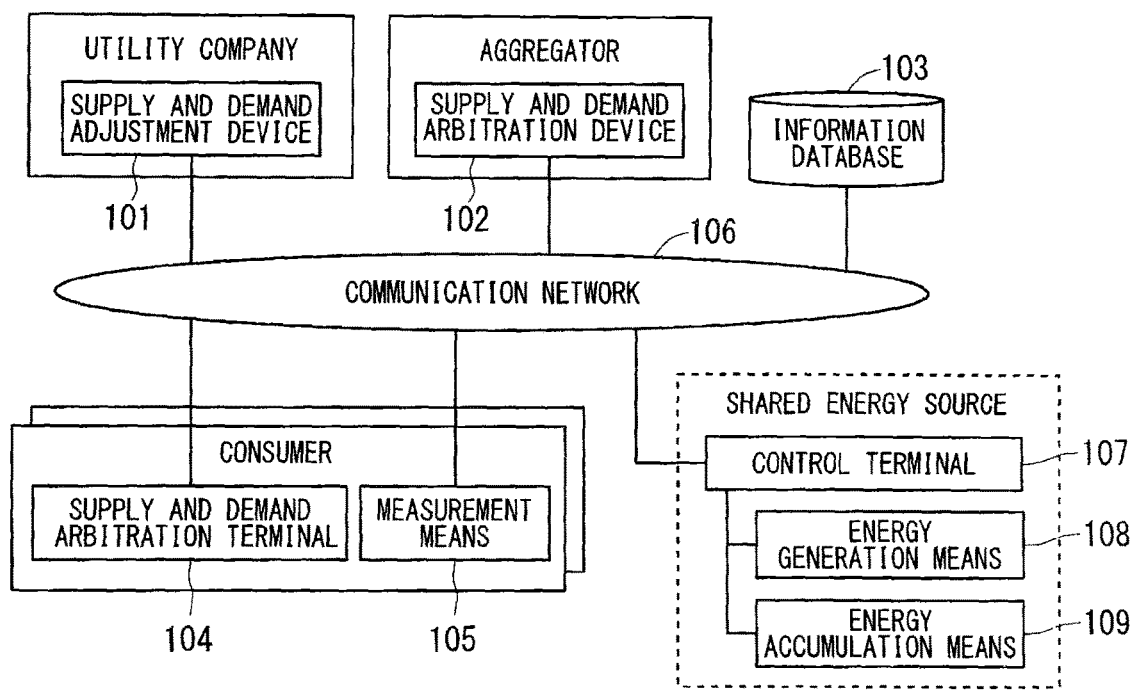

DEMAND AND SUPPLY ADJUSTMENT SYSTEM

TECHNICAL FIELD

The present invention relates to a supply and demand adjustment system that makes a utility company and an aggregator change an incentive to consumers through an information network to adjust supply and demand dynamically, thereby enabling adjustment of an energy amount with an optimum incentive during stringency in supply and demand. The utility company mentioned herein means a company that manufactures and feeds energy. The aggregator mentioned herein means a business operator who collects demands of multiple consumers and controls a demanded amount, thereby acting as an intermediary to provide more effective service of the supply and demand adjustment system.

BACKGROUND ART

Growing interest in energy in recent years has attracted attention on a technique that enables supply and demand adjustment of energy. According to this technique, in order to suppress energy demand at its peak, a supply side (utility company) requests a demand side (consumers) to reduce energy usage during a peak period of time, and an equivalent (hereinafter also called an incentive) is paid to a consumer having responded to the request for reduction.

Examples of a major rate menu relating to an incentive to be given by supply and demand adjustment include: a rate depending on time zones according to which a price is made higher in a time zone where energy demand is at its peak; charge to be made at an emergency peak intended to suppress energy usage by charging a price during stringency in energy supply and demand that is several times as high as that charged during a normal time; and a real-time rate according to which prices change in cooperation with a wholesale energy market price.

Conventionally, one-way notification from the supply side to the demand side has been used to adjust an energy amount. A mechanism of this adjustment is roughly divided into indirect supply and demand adjustment according to which the supply side urges the demand side to reduce energy usage by presenting an incentive to the demand side, and direct supply and demand adjustment according to which the supply side directly controls a load through a communication line based on a contract.

In contrast to the aforementioned conventional mechanisms, suppression of energy consumption in a more elaborate manner is expected for the future to be achieved by a smart grid or a smart community responsive to bidirectional control of the supply side and the demand side.

As an example, there has been a power supply and demand adjustment support system provided as a system to support in supply and demand adjusting task by a utility business operator (see patent literature 1, for example). Patent literature 1 describes that a target demand value is managed in units of consumers. This acts as means of support in the supply and demand adjusting task, thereby providing means of suppressing power to be used at a peak.

As another example, there has been a power distribution system acting as a system to encourage consumes to reduce energy consumption (see patent literature 2, for example). Patent literature 2 describes that power reduction is achieved by auction held between a terminal of a utility company and terminals of the consumers.

PATENT ART LITERATURES

Patent Literature

Patent Literature 1: Japanese Patent Application Laid-Open No. 2009-124885
Patent Literature 2: Japanese Patent Application Laid-Open No. 5-284649 (1993)

SUMMARY OF INVENTION

Problems to be Solved by Invention

A power supply and demand adjustment system is required to approach a given target value of power reduction with a minimum incentive cost to consumers. Meanwhile, there exist various conditions such as weather, regions, or environments where the consumers use power. Accordingly, an incentive should be optimized by changing the incentive (making the incentive variable). However, patent literatures 1 and 2 mentioned above do not take change in an incentive into consideration for adjusting supply and demand.

The present invention has been made to solve the aforementioned problems. It is an object of the present invention to provide a supply and demand adjustment system capable of adjusting supply and demand of energy while changing an incentive to consumers.

Means of Solving Problems

In order to solve the aforementioned problem, a supply and demand adjustment system of the present invention is a supply and demand adjustment system to make supply and demand adjustment of energy. The supply and demand adjustment system includes: a supply and demand adjustment device provided on a supply side of energy, the supply and demand adjustment device making a request for reduction in energy usage by consumers; supply and demand arbitration terminals provided on the side of the consumers; and a supply and demand arbitration device connected to the supply and demand adjustment device and the supply and demand arbitration terminals through a communication network in a manner that enables bidirectional communication therebetween. The supply and demand arbitration device works cooperatively with the supply and demand adjustment device to determine an incentive target value as a target value of an incentive to the consumers responsive to the request from the supply and demand adjustment device, makes a request to each of the consumers through the supply and demand arbitration terminals to reduce usage of the energy within a range of the incentive target value, summarizes a reducible energy amount responsive to this request and given from each of the consumers in replies through the supply and demand mediating terminals, and transmits the summarized amount to the supply and demand adjustment device. The supply and demand adjustment device and the supply and demand arbitration device make the supply and demand adjustment dynamically while changing the incentive target value.

Advantageous Effects of Invention

The present invention provides: the supply and demand adjustment device provided on the supply side of energy, the supply and demand adjustment device making a request for reduction in energy usage by consumers; the supply and demand arbitration terminals provided on the side of the consumers; and the supply and demand arbitration device connected to the supply and demand adjustment device and the supply and demand arbitration terminals through the communication network in a manner that enables bidirectional communication therebetween. The supply and demand arbitration device works cooperatively with the supply and demand adjustment device to determine the incentive target value as a target value of an incentive to the consumers responsive to the request from the supply and demand adjustment device, makes a request to each of the consumers through the supply and demand arbitration terminals to reduce usage of the energy within a range of the incentive target value, summarizes a reducible energy amount responsive to this request and given from each of the consumers in replies through the supply and demand arbitration terminals, and transmits the summarized amount to the supply and demand adjustment device. The supply and demand adjustment device and the supply and demand arbitration device make the supply and demand adjustment dynamically while changing the incentive target value. This enables supply and demand adjustment of energy while changing the incentive to the consumers.

These and other objects, features, aspects and advantages of the present invention will become more apparent from the following detailed description of the present invention when taken in conjunction with the accompanying drawings.

BRIEF DESCRIPTION OF DRAWINGS

FIG. 2 shows an example of a business model about an independent aggregator and that of an outsourcing aggregator according to the first embodiment of the present invention.

FIG. 3 explains a balance about the independent aggregator and a balance about the outsourcing aggregator according to the first embodiment of the present invention.

FIG. 7 shows an example of a table with which reduction plan information is managed in a information database according to the first embodiment of the present invention.

FIG. 11 shows an example of a changing sequence to be executed between the supply and demand arbitration device and the supply and demand arbitration terminals according to the first embodiment of the present invention.

FIG. 12 shows an example of operation in a reduction plan checking phase according to the first embodiment of the present invention.

FIG. 13 shows an exemplary structure of a supply and demand adjustment system according to a second embodiment of the present invention.

DESCRIPTION OF EMBODIMENTS

Embodiments of the present invention will be described below based on the drawings.

First Embodiment

Figure 1:
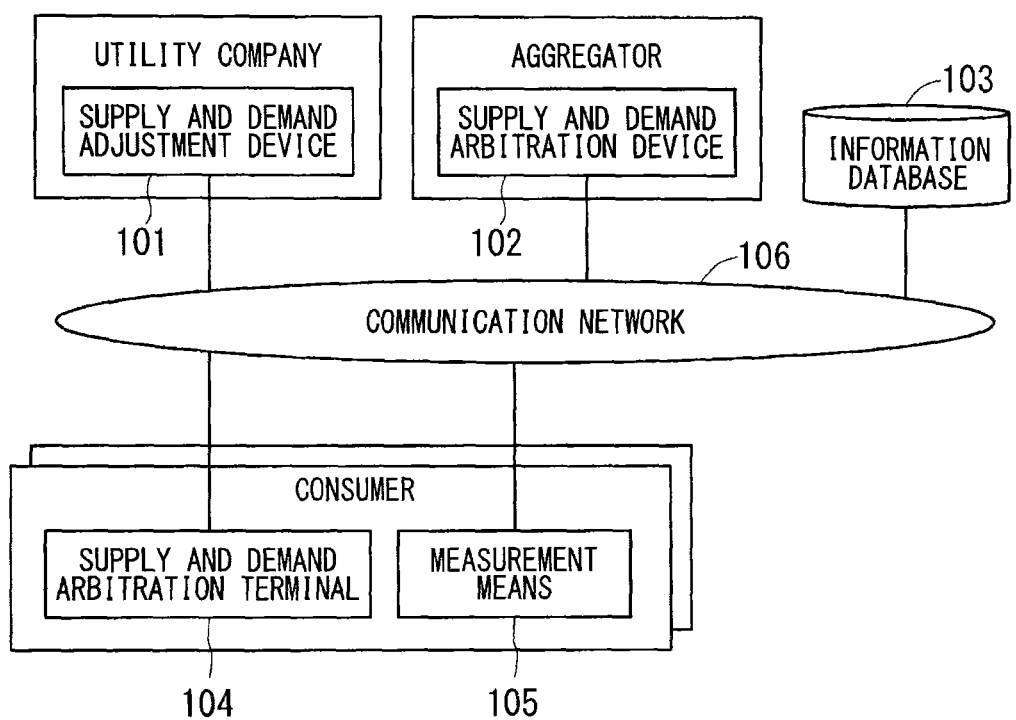
FIG. 1 shows an exemplary structure of a supply and demand adjustment system according to a first embodiment of the present invention.

FIG. 1 shows an exemplary structure of a supply and demand adjustment system according to a first embodiment of the present invention. As shown in FIG. 1, the supply and demand adjustment system of the first embodiment includes a supply and demand adjustment device 101 provided to a utility company, a supply and demand arbitration device 102 provided to an aggregator, an information database 103, and supply and demand arbitration terminals 104 and measurement means 105 provided to consumers. The supply and demand adjustment device 101, the supply and demand arbitration device 102, the information database 103, the supply and demand arbitration terminals 104, and the measurement means 105 are connected through a communication network 106 in a manner that enables bidirectional communication therebetween.

The supply and demand adjustment device 101 held by the utility company transmits a request for energy reduction and determines a target value of an incentive to consumers (hereinafter also called an incentive target value) in cooperation with the supply and demand arbitration device 102 held by the aggregator.

The supply and demand arbitration device 102 presents an incentive within a range of the incentive target value determined in cooperation with the supply and demand adjustment device 101 to the supply and demand arbitration terminals 104 held by consumers. The incentive is responsive to an energy amount that can be reduced by these consumers (hereinafter also called a reducible energy amount). Then, the supply and demand arbitration device 102 collects the reducible energy amount from the consumers.

The measurement means 105 measures an energy amount. The measurement means 105 may be held by any of the utility company, the consumers, or the aggregator.

The information database 103 stores an energy reduction plan, contract information about the consumers and the like necessary in the supply and demand adjustment system of the first embodiment. The information database 103 may be held by the utility company or the aggregator, or by a service provider other than the utility company and the aggregator.

Specifically, the supply and demand adjustment system of the first embodiment is to make supply and demand adjustment of energy. The supply and demand adjustment system includes: the supply and demand adjustment device 101 provided on a supply side of energy to make a request for reduction in energy usage by consumers; the supply and demand arbitration terminals 104 provided on the side of the consumers; and the supply and demand arbitration device 102 connected to the supply and demand adjustment device 101 and the supply and demand arbitration terminals 104 through the communication network 106 in a manner that enables bidirectional communication therebetween. The supply and demand arbitration device 102 works cooperatively with the supply and demand adjustment device 101 to determine an incentive target value as a target value of an incentive to the consumers responsive to the request from the supply and demand adjustment device 101, makes a request to each of the consumers through the supply and demand arbitration terminals 104 to reduce energy usage within a range of the incentive target value, summarizes a reducible energy amount responsive to this request and given from each of the consumers in replies through the supply and demand arbitration terminals 104, and transmits the summarized amount to the supply and demand adjustment device 101. The supply and demand adjustment device 101 and the supply and demand arbitration device 102 adjust supply and demand dynamically while changing the incentive target value.

FIG. 2 shows an example of a business model about an independent aggregator and that of an outsourcing aggregator.

As shown in FIG. 2, in the case of the independent aggregator, the aggregator appropriates an incentive target from a utility company for an income of the aggregator itself and for payment of incentive to consumers. In the case of the outsourcing aggregator, the utility company pays an incentive to consumers. The income of the aggregator is determined by an outsourcing fee S to be paid from the utility company for acting for the utility company to reduce energy and by a rate of compensation E responsive to reduction performance evaluation to be paid from the utility company to the aggregator.

FIG. 3 explains the details of a balance about the independent aggregator and those about the outsourcing aggregator. In FIG. 3, Ct means a target value of an incentive target, Cs means an upper limit of the incentive target (hereinafter also called an incentive target upper limit), Cd means an income of consumers, and y means the number of the consumers.

The balance about the outsourcing aggregator is described first.

The outsourcing aggregator sets the incentive target value Ct together with the utility company, and collects reducible energy from the consumers so as to fall within a range of the incentive target value Ct. As a result of the collection, the outsourcing aggregator multiplies a difference (Cs−Cr) between the incentive target upper limit Cs and an actual value Cr of payment ($=\Sigma Cd_{(y)}$) of incentives to the consumers by the rate of compensation E to the aggregator. Further, the outsourcing aggregator adds the outsourcing fee S to a result of the multiplication to determine an amount to become the income Ca of the outsourcing aggregator. Specifically, the following relational expression is established about the income Ca of the outsourcing aggregator:

$$Ca=S+(Cs-Cr)\times E \quad (1)$$

The rate of compensation to the outsourcing aggregator is determined based on an accuracy of achievement of previous prediction (as an example, a ratio of an energy amount to be reduced committed by the consumers to an energy amount to be reduced requested from the utility company), a difference between a reduction plan made in the past and actual performance indicated by measurement data about a reduction result obtained according to the reduction plan, or a distribution to the utility company, for example.

The balance about the independent aggregator is described first.

The independent aggregator sets the incentive target value Ct together with the utility company, and collects reducible energy from consumers so as to fall within a range of the incentive target value Ct. As a result of the collection, the independent aggregator obtains a difference (Cs−Cr) between the incentive target upper limit Cs and the actual value Cr of payment ($=\Sigma Cd_{(y)}$) of incentives to the consumers, and a resultant amount becomes the income Ca of the independent aggregator. In terms of the aforementioned relational expression (1) about the income Ca of the outsourcing aggregator, in the case of the independent aggregator, the outsourcing fee S is 0 for the reason of absence of an outsourcing fee to be paid from the utility company. Further, the rate of compensation E becomes 1 for the reason that a distribution to the utility company is 0 (for the reason of absence of a distribution to the utility company). Specifically, the following relational expression is established about the income Ca of the independent aggregator:

$$Ca=(Cs-Cr) \quad (2)$$

The operation of the supply and demand adjustment system of the first embodiment has the following three phases: a reduction planning phase to determine an incentive target relative to a reduction target; a reduction plan changing phase responsive to a request for change from consumers; and a reduction plan checking phase responsive to check of a reduction plan before execution of reduction. The following describes operation in each phase in detail.

The reduction planning phase is described first.

Figure 4:
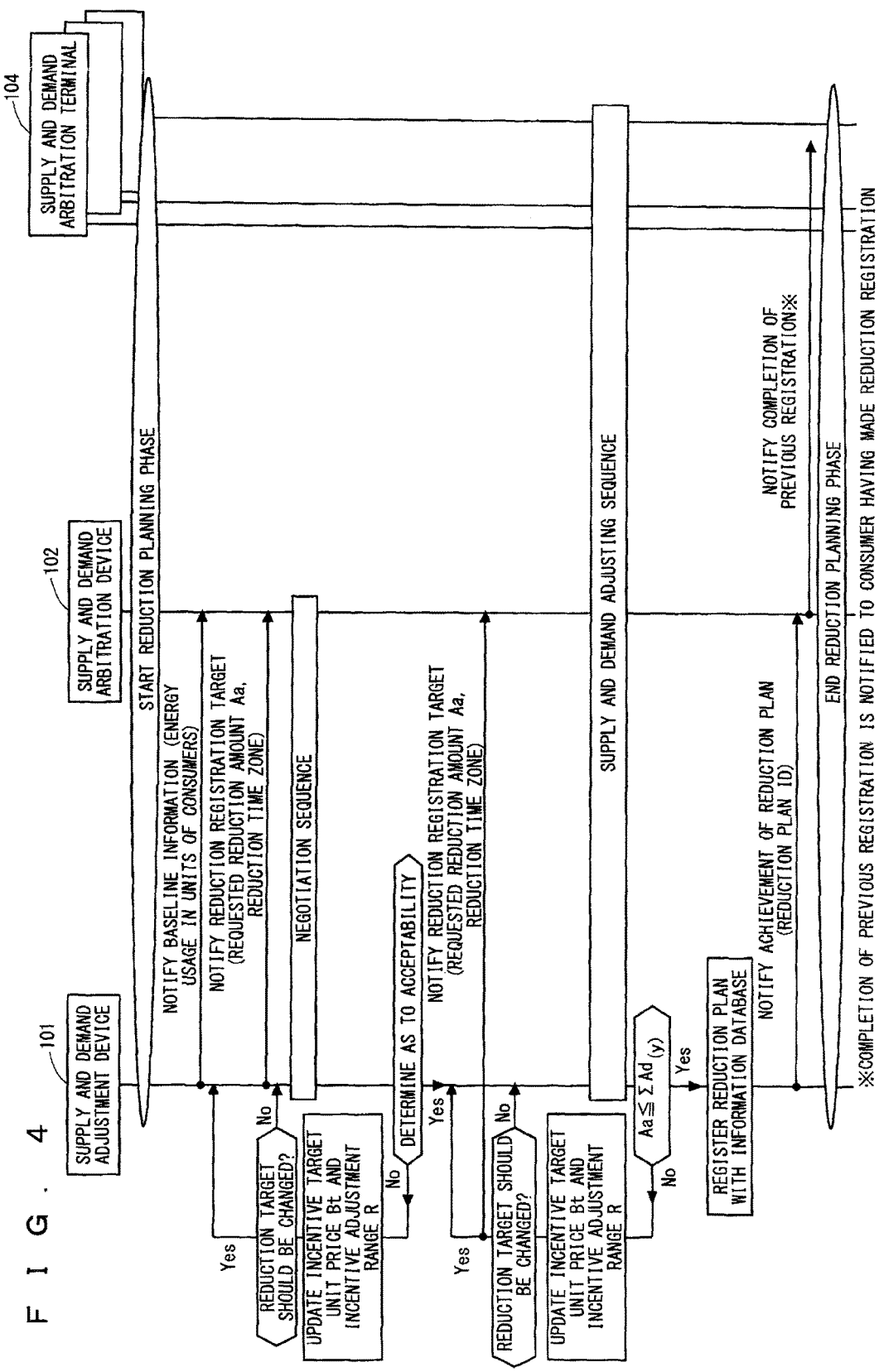
FIG. 4 shows an example of operation in a reduction planning phase according to the first embodiment of the present invention.

FIG. 4 shows an example of operation in the reduction planning phase. As shown in FIG. 4, when the reduction planning phase is started, the supply and demand adjustment device 101 notifies the supply and demand arbitration device 102 of a requested reduction amount Aa and a reduction time zone as a reduction registration target. Further, the supply and demand adjustment device 101 notifies the supply and demand arbitration device 102 of energy usage in units of consumers as base line information. Next, a negotiation sequence is executed between the supply and demand arbitration device 101 and the supply and demand arbitration device 102. The aforementioned baseline information can be calculated based on measurement information obtained by the measurement means 105 installed on the side of consumers. Where necessary, the consumers can acquire the measurement information obtained by the measurement means 105. If the consumers do not manage the baseline information, an aggregator may notify the baseline information in response to a request from the consumers.

Figure 5:
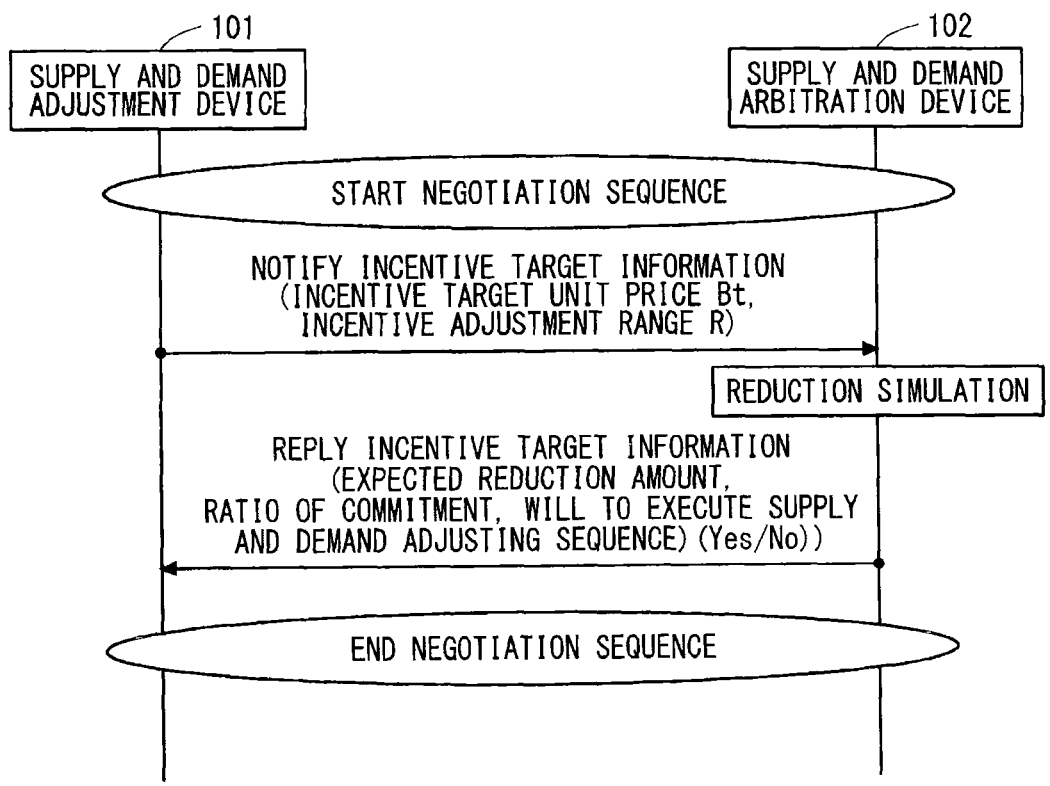
FIG. 5 shows an example of a negotiation sequence to be executed between a supply and demand adjustment device and a supply and demand arbitration device according to the first embodiment of the present invention.

FIG. 5 shows an example of the negotiation sequence to be executed between the supply and demand adjustment device 101 and the supply and demand arbitration device 102. As shown in FIG. 5, when the negotiation sequence is started between the supply and demand adjustment device 101 and the supply and demand arbitration device 102, the supply and demand adjustment device 101 notifies the supply and demand arbitration device 102 of incentive target information. The incentive target information includes an incentive target unit price Bt, and an adjustment range R of the incentive target unit price Bt (maximum and minimum of the incentive target unit price). Based on conditions such as reduction performance achieved in the past, weather information, characteristics of each consumer or an empirical rule, for example, the supply and demand arbitration device 102 runs a reduction simulation using the incentive target information notified from the supply and demand adjustment device 101 (simulation to predict an energy amount that can be reduced by each consumer), thereby tentatively calculating an expected reduction amount and a ratio of commitment by the consumers to the expected reduction amount. Then, the supply and demand arbitration device 102 makes a reply to the supply and demand adjustment device 101 by adding the tentatively calculated expected reduction amount, the ratio of commitment, and a will determined together with the consumers as to whether supply and demand is to be adjusted (Yes/No). Then, the negotiation sequence is ended.

The aforementioned commitment is an attribute of a reduction reply from the consumers and shows commitment to a reduction amount (reducible energy amount). If the commitment is not fulfilled (if an energy amount corresponding to the reducible energy amount cannot be reduced), a penalty will be issued. If the commitment is fulfilled (if an energy amount corresponding to the reducible energy amount cannot be reduced), an incentive unit price becomes higher. Meanwhile, a reduction reply from the consumers has a voluntary attribute. In the case of a volunteer, no penalty will be issued even if the commitment is not fulfilled whereas an incentive unit price is low even if the commitment is fulfilled. In this way, a higher ratio of commitment of a reduction amount increases an accuracy of achievement of a reduction target. This works advantageously for a utility company. Meanwhile, suppressing a unit price of an incentive to the consumers (according to the aggregator's discretion) while ensuring a ratio of commitment increases a rate of compensation. This works advantageously for the aggregator.

Referring back to FIG. 4, when the negotiation sequence between the supply and demand adjustment device 101 and the supply and demand arbitration device 102 is ended, the supply and demand adjustment device 101 determines whether the expected reduction amount and the ratio of commitment included in the reply from the supply and demand arbitration device 102 are to be accepted. If determining that they are to be accepted, the supply and demand adjusting device 101 executes supply and demand adjusting sequence. If determining that they are not to be accepted, the supply and demand adjusting device 101 updates the incentive target unit price Bt and the incentive adjustment range R, and then executes the negotiation sequence again. Where change in a reduction target is necessary, a requested reduction amount or a reduction time zone may be changed.

Figure 6:
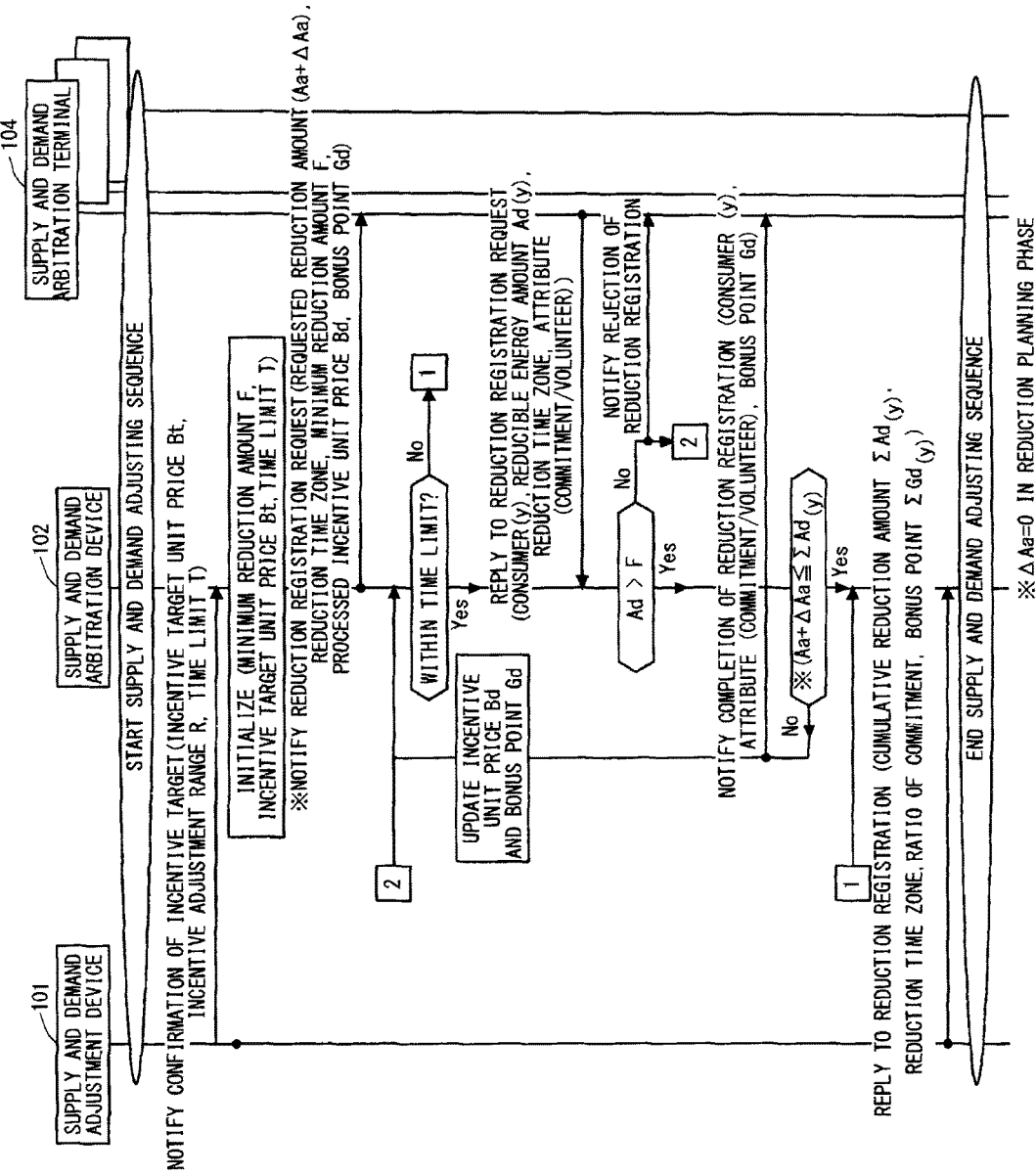
FIG. 6 shows an example of a supply and demand adjusting sequence to be executed between the supply and demand adjustment device, the supply and demand arbitration device, and supply and demand arbitration terminals according to the first embodiment of the present invention.

FIG. 6 shows an example of the supply and demand adjusting sequence to be executed between the supply and demand adjustment device 101, the supply and demand arbitration device 102, and the supply and demand arbitration terminals 104. As shown in FIG. 6, when the supply and demand adjusting sequence is started, the supply and demand adjustment device 101 notifies the supply and demand arbitration device 102 of the incentive unit price Bt and the incentive adjustment range R confirmed together with the supply and demand arbitration device 102 in the negotiation sequence, and a time limit T for a reply (notifies confirmation of incentive target).

In response to receipt of the notification of the confirmation of an incentive target, the supply and demand arbitration device 102 initializes a minimum reduction amount F, the incentive target unit price Bt, and the time limit T. Then, the supply and demand arbitration device 102 notifies each supply and demand arbitration terminal 104 of a reduction registration request. The reduction registration request includes the requested reduction amount Aa, a reduction time zone, an incentive unit price Bd (reset incentive value) processed (reset) for the consumers within a range of the incentive adjustment range R, the minimum reduction amount F, and a bonus point Gd.

The minimum reduction amount F is intended to achieve efficient supply and demand adjustment by preventing the supply and demand arbitration terminals 104 from making reduction registration with a reducible energy amount Ad of a certain amount or less. The bonus point Gd is a system of giving an additional incentive if the consumers make reduction replies at an early stage or commit a large reducible energy amount, thereby putting principles of competition into operation among the consumers to prompt supply and demand adjustment.

In response to receipt of the notification of the reduction registration request from the supply and demand arbitration device 102, the supply and demand arbitration terminals 104 make replies about the reducible energy amount Ad, a reduction time zone, and an attribute (commitment or volunteer) (reply to reduction registration request).

The supply and demand arbitration device 102 updates the incentive unit price Bd and the bonus point Gd to continue accepting replies to the reduction registration request within the set time limit T or until a cumulative reduction amount $\Sigma Ad_{(y)}$ of reducible energy $Ad_{(y)}$ given in the replies from the supply and demand arbitration terminals 104 has reached the requested reduction amount Aa. The supply and demand arbitration device 102 notifies a supply and demand arbitration terminal 104 having made a reply of completion of reduction registration.

If the set time limit T has elapsed or if the cumulative reduction amount $\Sigma Ad_{(y)}$ has reached the requested reduction amount Aa, the supply and demand arbitration device 102 makes a reply to the supply and demand adjustment device 101 about the cumulative reduction amount $\Sigma Ad_{(y)}$, a reduction time zone, a ratio of commitment, and a bonus point $\Sigma Gd_{(y)}$ (reply to reduction registration). Then, the supply and demand adjusting sequence is ended. If the aggregator is responsible for payment of the bonus point Gd, the reply may not include the bonus point $\Sigma Gd_{(y)}$.

Referring back to FIG. 4, after the supply and demand adjusting sequence is ended, the supply and demand adjustment device 101 determines whether the cumulative reduction amount $\Sigma Ad_{(y)}$ has reached the requested reduction amount Aa. If determining that the cumulative reduction amount $\Sigma Ad_{(y)}$ has not reached the requested reduction amount Aa, the supply and demand adjustment device 101 updates the incentive target unit price Bt and the incentive adjustment range R and then executes the supply and demand adjusting sequence again. As a result of this update, the incentive target unit price Bt and the incentive adjustment range R may remain the same. This determination is made if the supply and demand adjusting sequence is ended for elapsing the time limit T in this supply and demand adjusting sequence. Accordingly, this determination may be omitted if a similar determination has been made already in the supply and demand adjusting sequence and this supply and demand sequence has been ended.

If determining in the aforementioned determination that the cumulative reduction amount $\Sigma Ad_{(y)}$ has reached the requested reduction amount Aa, the supply and demand adjustment device 101 registers parameters as reduction plan information including the cumulative reduction amount $\Sigma Ad_{(y)}$, the incentive target unit price Bt, the incentive adjustment range R and a ratio of commitment with the information database 103, and acquires a reduction plan ID. Further, the supply and demand adjustment device 101 makes notification including the reduction plan ID to the supply and demand arbitration device 102 (notifies achievement of reduction plan).

As described above, the supply and demand arbitration device 102 presents to the consumers through the supply and demand arbitration terminals 104 the processed incentive unit price Bd (reset incentive value) processed (reset) by making certain adjustment on an incentive target value and an energy amount to be reduced requested from the supply and demand adjustment device 101. Then, the supply and demand arbitration device 102 collects a reducible energy amount from the supply and demand arbitration terminals 104. If the reducible energy amount has reached the energy amount to be reduced, the supply and demand arbitration device 102 stops the collection. If the reducible energy amount has not reached the energy amount to be reduced, the supply and demand adjustment device 101 updates the incentive target value and then the supply and demand arbitration device 102 makes the aforementioned presentation and the aforementioned collection again.

FIG. 7 shows an example of a table with which reduction plan information is managed in the information database 103. As shown in FIG. 7, a reduction plan ID is assigned to each reduction plan. A requested reduction amount, a cumulative reduction amount, time and date of execution of reduction, an incentive target unit price, an actual incentive unit price, an incentive adjustment range, and a ratio of commitment can be referred to for each reduction plan ID.

The supply and demand arbitration device 102 notifies a supply and demand arbitration terminal 104 having made reduction registration of completion of previous registration. Then, the reduction planning phase is ended.

The reduction plan information may be registered not only with the information database 103 but it may alternatively be registered with the supply and demand arbitration device 102. In this case, the supply and demand adjustment device 101 makes the notification of achievement of a reduction plan without including a reduction plan ID. The supply and demand arbitration device 102 registers a reduction plan and acquires a reduction plan ID. Then, the supply and demand arbitration device 102 makes a reply to the supply and demand adjustment device 101 about achievement of a reduction plan including the reduction plan ID.

Figure 8:
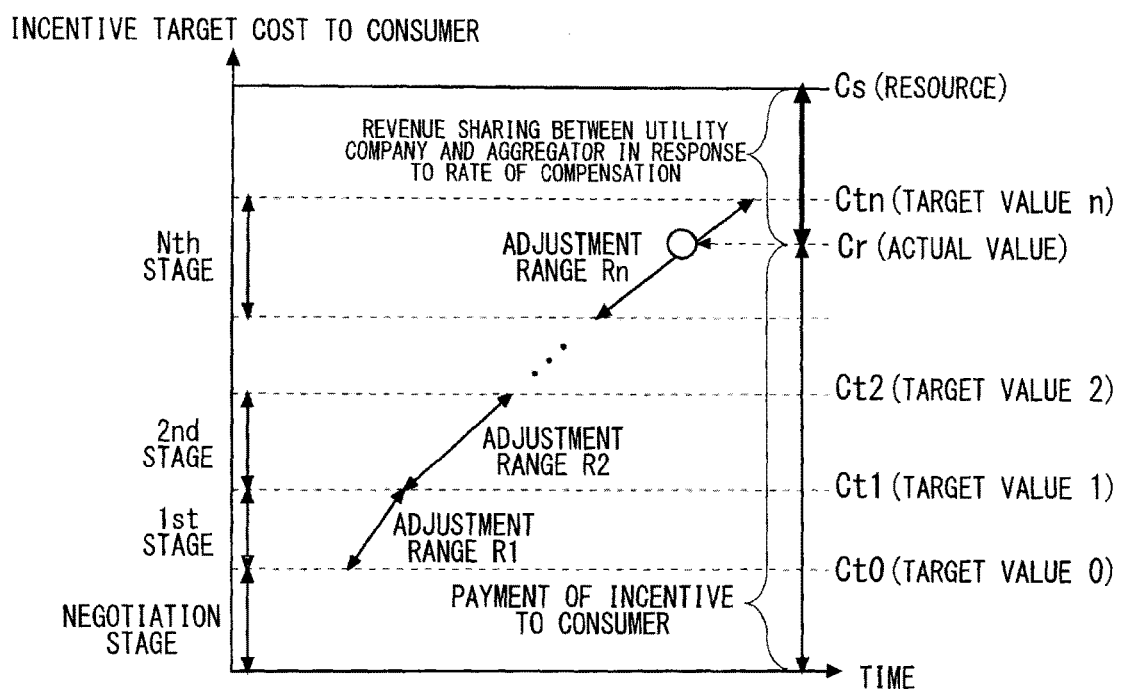
FIG. 8 explains setting of an incentive target value in the reduction planning phase according to the first embodiment of the present invention.

Setting of an incentive target value in the reduction planning phase is described next using FIG. 8. As shown in FIG. 8, in a negotiation stage, a target value Ct0 is determined in the negotiation sequence (see FIG. 5). Next, the supply and demand adjusting sequence (see FIG. 6) is executed N times in stages including a first stage. A reduction plan is deemed to be confirmed when a target value Ctn is obtained. At this time, a target value of an incentive to the consumers is CM and an incentive adjustment range is Rn. Accordingly, the following relational expression is established about the actual value Cr relative to the incentive target:

$$Ctn - Rn \leq Cr \leq Ctn \quad (3)$$

In the aforementioned expression (3), Cr is a payment of an incentive to the consumers, and (Cs−Cr) is cost of revenue sharing between the utility company and the aggregator.

Figure 9:
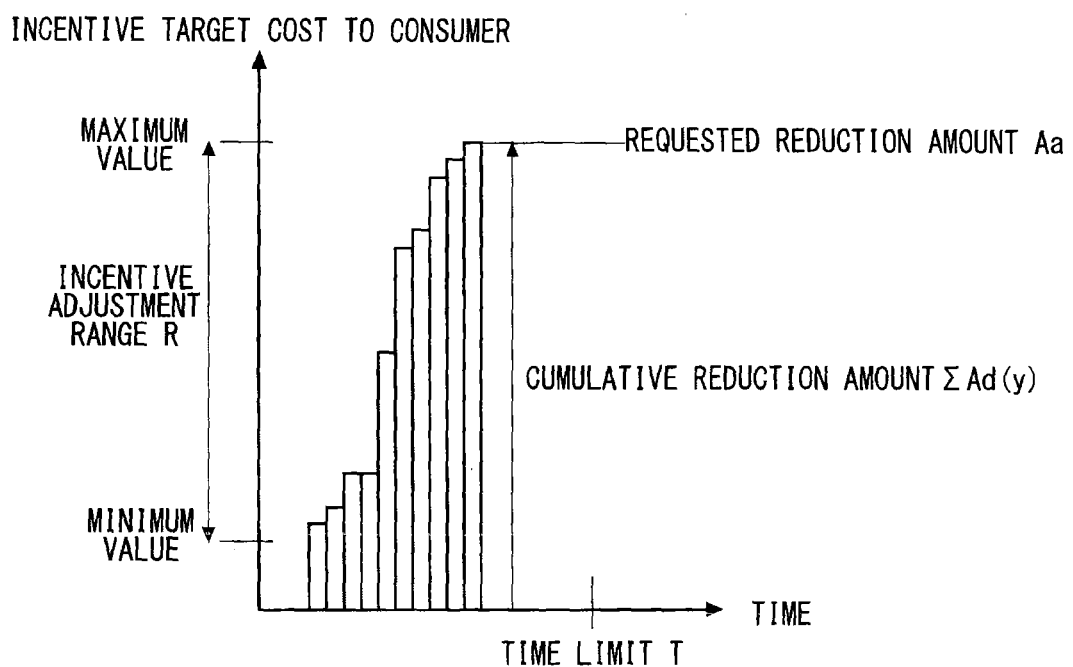
FIG. 9 explains collection of energy that can be reduced by consumers in the reduction planning phase according to the first embodiment of the present invention.

Collection of reduction replies (reducible energy amount) from the consumers in the reduction planning phase is described using FIG. 9. As shown in FIG. 9, if the cumulative reduction amount $\Sigma Ad_{(y)}$ has reached the requested reduction amount Aa within the time limit T, the supply and demand arbitration device 102 finishes the collection.

The reduction plan changing phase is described next.

Figure 10:
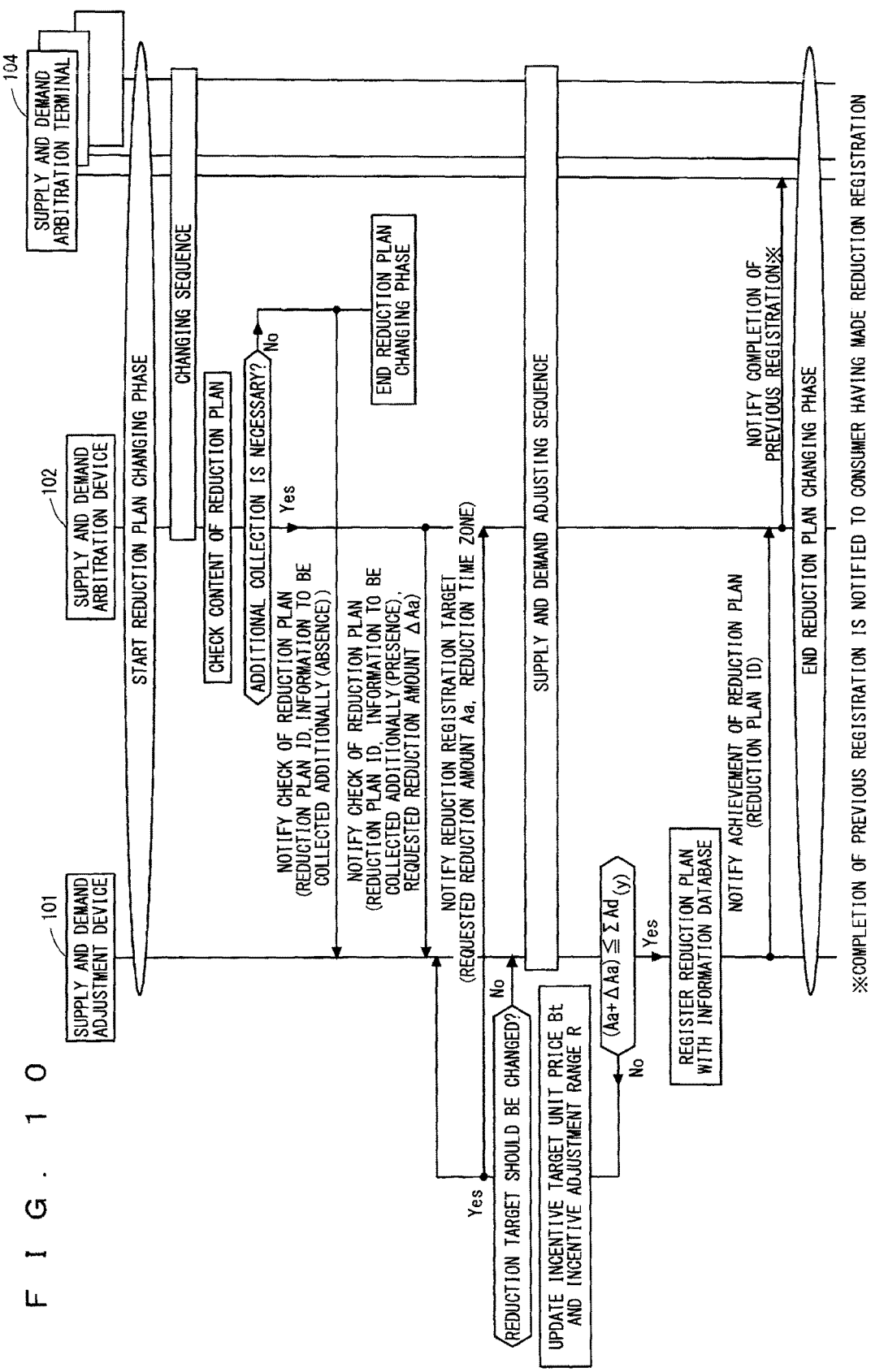
FIG. 10 shows an example of operation in a reduction plan changing phase according to the first embodiment of the present invention.

FIG. 10 shows an example of operation in the reduction plan changing phase. After the reduction planning phase is ended, the reduction plan changing phase is executed each time the supply and demand arbitration terminals 104 request change in a reduction plan. As shown in FIG. 10, when the reduction plan changing phase is started, a changing sequence is executed between the supply and demand arbitration device 102 and the supply and demand arbitration terminals 104, so that the supply and demand arbitration device 102 changes the content of the reduction plan.

FIG. 11 shows an example of the changing sequence to be executed between the supply and demand arbitration device 102 and the supply and demand arbitration terminals 104. As shown in FIG. 11, when the changing sequence is started, each supply and demand arbitration terminal 104 notifies the supply and demand arbitration device 102 of the content of change in the reducible energy amount Ad, a reduction time zone, or an attribute (commitment or volunteer) (notifies request for change in reduction content).

The supply and demand arbitration device 102 determines whether the content of the change notified from the supply and demand arbitration terminals 104 is to be accepted. If determining that the content of the change is not to be accepted (unacceptable), the supply and demand arbitration device 102 notifies the supply and demand arbitration terminals 104 of rejection of change in reduction content. The content of the change is determined to be unacceptable if the change is to be made immediately before time and date of execution of reduction or if it is determined that the change cannot be made in time for the reason of a large amount of commitment registered for reduction, for example. Meanwhile, if determining as a result of the determination that the content of the change is to be accepted (acceptable), the supply and demand arbitration device 102 makes a reply to the supply and demand arbitration terminals 104 about the change in the reduction content (reply to request for change in reduction content). Then, the changing sequence is ended.

If an attribute is to be changed from commitment to volunteer or retreat from a reduction plan is intended, the aggregator may impose a penalty on the consumers for the change. Conditions for making a determination that the content of the change is unacceptable or conditions for imposing the penalty are determined in consideration of a contract between the aggregator and the consumers or in terms of a service aspect. Replies to the request for the change in reduction content from the supply and demand arbitration device 102 to the supply and demand arbitration terminals 104 are not always transmitted individually or simultaneously but they may alternatively be transmitted in groups or transmitted after being accumulated. A way of the transmission can be modified in a range that does not change the substance.

Referring back to FIG. 10, the supply and demand arbitration device 102 checks the content of the reduction plan. If determining that additional collection of the requested reduction amount Aa becomes necessary as a result of the changing sequence, the supply and demand arbitration device 102 notifies the supply and demand adjustment device 101 of a target reduction plan ID, (presence of) information to be collected additionally, and an additionally requested reduction amount ΔAa (notifies check of reduction plan). Then, the supply and demand adjustment sequence is executed. If determining that additional collection of the requested reduction amount Aa is unnecessary, the supply and demand arbitration device 102 notifies the supply and demand adjustment device 101 of a target reduction plan ID and (absence of) information to be collected additionally (notifies check of reduction plan). In the absence of information to be collected additionally, the supply and demand arbitration device 102 is not necessarily required to make notification to the supply and demand adjustment device 101. A way of the notification can be modified in a range that does not change the substance.

The operation in the reduction plan changing phase to be performed after the supply and demand adjusting sequence can be regarded as being the same entirely as that of the corresponding operation in the reduction planning phase (FIG. 4) by replacing the requested reduction amount Aa by a requested reduction amount Aa+ΔAa. Accordingly, this operation in the reduction plan changing phase is not described here.

The reduction plan checking phase is described next.

FIG. 12 shows an example of operation in the reduction plan checking phase. The reduction plan checking phase is executed before time and date of execution of reduction and when a check including check on the presence or absence of a reduction plan is to be made. As an example of timing for making the check, the check is assumed to be made about twice: as a previous check, the check is made one day before execution of reduction; and as an immediate check, the check is made about several hours before the execution of reduction. These are not the only number of times of the check and time zones of the check. A way of making the check can be modified in a range that does not change the substance.

The supply and demand adjustment device 101 notifies the supply and demand arbitration device 102 of a target reduction plan ID, information about execution of reduction (information about presence or absence of execution of reduction), and the requested reduction amount Aa (notifies check of reduction plan).

Subsequent operation is the same as the corresponding operation in the reduction plan changing phase, so that it is not described here. A requested reduction amount may be identified by Aa or Aa+ΔAa. A reduction plan may checked in response to a trigger transmitted from the supply and demand arbitration device 102. Alternatively, the content of a reduction plan may be checked automatically at a given time without using a trigger. A way of checking a reduction plan can be modified in a range that does not change the substance.

As described above, the supply and demand adjustment system of the first embodiment is capable of adjusting supply and demand dynamically while changing an incentive to consumers. In particular, the supply and demand adjustment system enables supply and demand adjustment of an energy amount with an optimum incentive during stringency in supply and demand. Optimizing an incentive to the consumers enables energy reduction at lower cost. This works advantageously for both a utility company and an aggregator. Further, introducing a contingent fee rate responsive to a difference between an accuracy of achievement of previous prediction about an energy amount to be reduced and actual reduction performance makes it possible to prompt the aggregator to make an effort for reduction. The utility company, the aggregator, and the consumers can perform a series of processes by following a sequence that enables bidirectional communication, so that work of adjusting supply and demand of an energy amount is done efficiently. As a result, supply and demand of an energy amount can be adjusted readily during stringency in supply and demand, thereby achieving more effective use of energy while avoiding forcible interrupt of supply and demand.

Second Embodiment

FIG. 13 shows an exemplary structure of a supply and demand adjustment system according to a second embodiment of the present invention. The supply and demand adjustment system of the second embodiment is formed by expanding the supply and demand adjustment system of the first embodiment (see FIG. 1). Elements same as those of the first embodiment will not be described below.

As shown in FIG. 13, the supply and demand adjustment system of the second embodiment includes energy generation means 108 as means of generating energy, energy accumulation means 109 as means of accumulating energy, and a control terminal 107 that controls the energy generation means 108 and the energy accumulation means 109. The control terminal 107 is connected to the supply and demand arbitration terminals 104 in a manner that enables bidirectional communication therebetween. The energy generation means 108, the energy accumulation means 109, and the control terminal 107 are provided on the side of consumers.

In the second embodiment, the control terminal 107, the energy generation means 108, and the energy accumulation means 109 are collectively called a shared energy source. This shared energy source is provided to be shared among consumers in units of communities.

The energy generation means 108 is means of generating renewable energy and additionally, energy for an electric generator or a gas generator. The energy accumulation means 109 is means of accumulating generated energy such as a storage battery, a gas holder or a water source.

Figure 14:
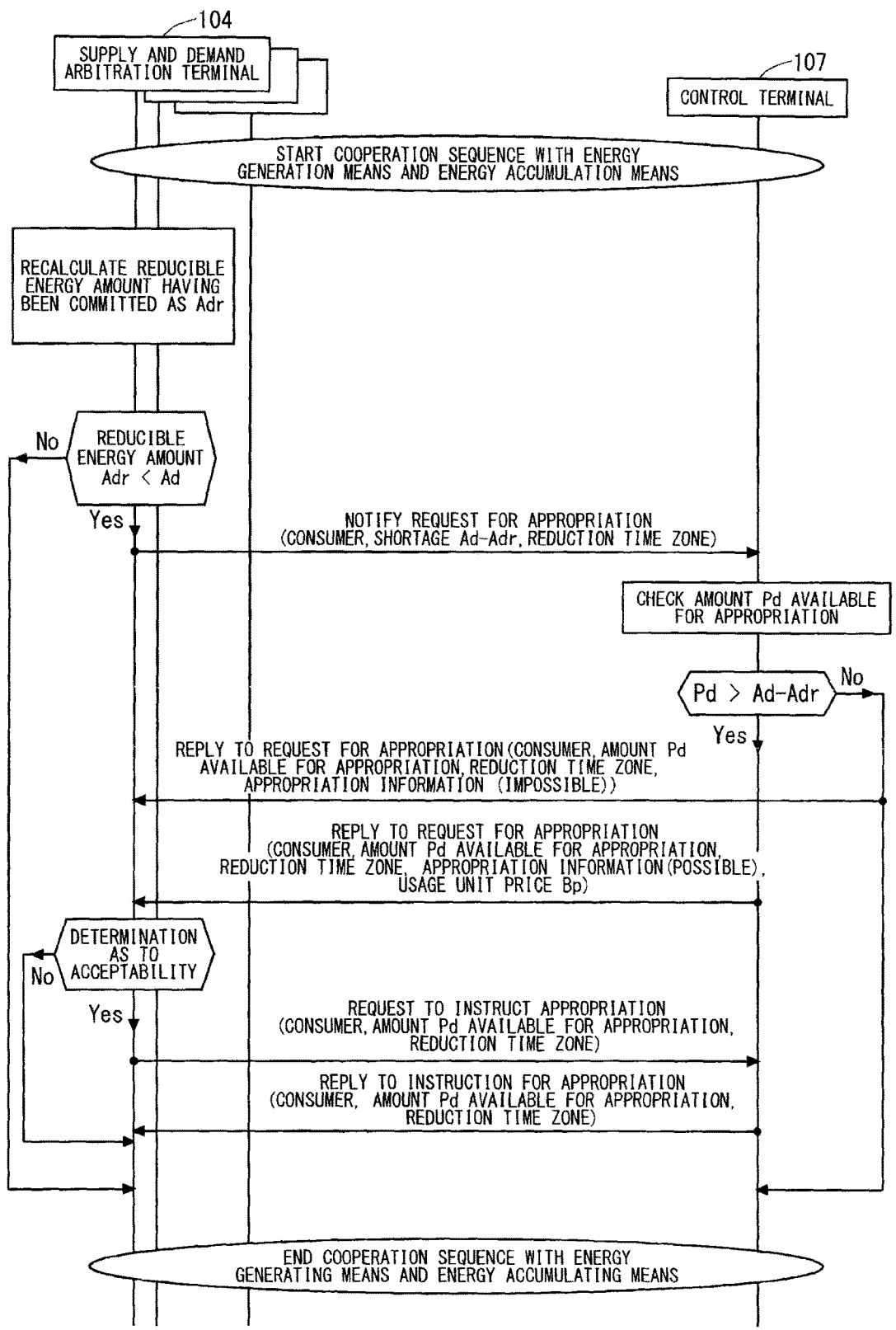
FIG. 14 shows an example of a sequence to be executed between supply and demand arbitration terminals and a control terminal by cooperation with energy generation means and energy accumulation means according to the second embodiment of the present invention.

FIG. 14 shows an example of a sequence to be executed between the supply and demand arbitration terminals 104 and the control terminal 107 by cooperation with the energy generation means 108 and the energy accumulation means 109. The cooperation sequence shown in FIG. 14 corresponds to interaction between the supply and demand arbitration terminals 104 and the control terminal 107. Timing of the cooperation sequence to be executed by consumers after the reduction planning phase is determined arbitrarily.

In preparation for execution of energy reduction, the supply and demand arbitration terminals 104 calculate a reducible energy amount again and define the recalculated amount as Adr before or immediately before the execution. If the recalculated reducible energy amount Adr does not reach the reducible energy amount Ad having been targeted for commitment, the supply and demand arbitration terminals 104 notify the control terminal 107 of a request for appropriation for a shortage (Ad−Adr).

The control terminal 107 checks an amount Pd available for appropriation. If the amount Pd available for appropriation is larger than the shortage (Ad−Adr), the control terminal 107 determines that the shortage can be appropriated. Then, the control terminal 107 makes a reply to the supply and demand arbitration terminals 104 about an amount available for appropriation, a reduction time zone, appropriation information (possible), and a usage unit price Bp (reply to request for appropriation). If the amount Pd available for appropriation is smaller than the shortage (Ad−Adr), the control terminal 107 determines that the shortage cannot be appropriated. Then, the control terminal 107 makes a reply to the supply and demand arbitration terminals 104 about an amount available for appropriation, a reduction time zone, and appropriation information (impossible) (reply to request for appropriation).

Based on the amount Pd available for appropriation and the usage unit price Bp in the reply from the control terminal 107, the supply and demand arbitration terminals 104 examine economical advantage (determine cost-effectiveness) in consideration of a penalty to be imposed for failing to achieve the reducible energy amount Ad having been targeted for commitment during execution of energy reduction. Then, the supply and demand arbitration terminals 104 determine whether the reply from the control terminal 107 is to be accepted. If determining that using the shared energy source brings about larger advantage, the supply and demand arbitration terminals 104 request the control terminal 107 for appropriation (request to instruct appropriation). Then, the control terminal 107 makes a reply to the supply and demand arbitration terminals 104 about the request for appropriation (reply to instruction for appropriation).

As described above, in the second embodiment, at the time of execution of energy reduction, if the recalculated reducible energy amount Adr does not reach the reducible energy amount Ad having been targeted for commitment, consumers pay an equivalent to avoid a penalty. This makes the shared energy source make appropriation for energy, so that a required energy amount can be compensated for. This contributes to increase of a ratio of commitment of a reducible energy amount while providing an aggregator with the equivalent that is to become a source of income of the aggregator.

The embodiments of the present invention can be combined freely or each of the embodiments can be modified or omitted where appropriate without departing from the scope of the invention.

While the invention has been shown and described in detail, the foregoing description is in all aspects illustrative and does not restrict the invention. It is therefore understood that numerous modifications not illustrated can be devised without departing from the scope of the invention.

REFERENCE SIGNS LIST

101 Supply and demand adjustment device
102 Supply and demand arbitration device
103 Information database
104 Supply and demand arbitration terminal
105 Measurement means
106 Communication network
107 Control terminal
108 Energy generation means
109 Energy accumulation means

The invention claimed is:

1. A supply and demand adjustment system to make supply and demand adjustment of energy, comprising:
   a supply and demand adjustment device provided on a supply side of said energy, the supply and demand adjustment device making a request of a target reduction value for a reduction in energy usage by consumers;
   supply and demand arbitration terminals provided on a side of said consumers; and
   a supply and demand arbitration device connected to said supply and demand adjustment device and said supply and demand arbitration terminals through a communication network in a manner that enables bidirectional communication therebetween, the supply and demand arbitration device
   working cooperatively with said supply and demand adjustment device to determine an incentive target value and an adjustment range of the incentive target value, the incentive target value being determined by providing feedback to said supply and demand adjustment device, the feedback relating to an amount that said consumers will reduce energy usage in response to values being proposed for the incentive target value, and the incentive target value being a target value of an incentive to said consumers relating to said request from said supply and demand adjustment device,
   working cooperatively with said supply and demand arbitration terminals to change, within the adjustment range, the incentive target value using feedback to the supply and demand arbitration device representing an amount of reducible energy by said consumers in response to the incentive target value, the changing of the incentive target value including
      making requests to said consumers through said supply and demand arbitration terminals, the requests including the incentive target value, and
      summarizing the amount of the reducible energy indicated in replies from said consumers, through said supply and demand arbitration terminals, in response to the requests to generate the summarized amount, and
   transmitting the summarized amount to said supply and demand adjustment device, wherein
   said supply and demand adjustment device and said supply and demand arbitration device are configured to change said target reduction value for the reduction in the energy usage by the consumers dynamically while changing said incentive target value.

2. The supply and demand adjustment system according to claim 1, wherein said supply and demand adjustment device notifies said supply and demand arbitration device of an amount of said energy to be reduced and a reduction time zone before said incentive target value is determined.

3. The supply and demand adjustment system according to claim 1, wherein said supply and demand arbitration device
   presents to said consumers through said supply and demand arbitration terminals
      a reset incentive value, which is reset by making a predefined adjustment on said incentive target value, and
      an amount of said reduction in said energy usage by said consumers requested from said supply and demand adjustment device,
   then collects said reducible energy amount from said supply and demand arbitration terminals, and
   stops the collection of said reducible energy amount if said reducible energy amount has reached said amount of said requested reduction in said energy usage by said consumers, otherwise
      if said reducible energy amount has not reached said amount of said requested reduction in said energy usage by said consumers, then said incentive target value is updated by said supply and demand adjustment device and said supply and demand arbitration device repeats the presenting of the reset incentive value and of the requested amount of said reduction in said energy usage by said consumers and the collecting of said reducible energy amount.

4. The supply and demand adjustment system according to claim 1, wherein said supply and demand arbitration device is further configured to collect said reducible energy amount additionally based on a content of said request from said supply and demand adjustment device if said supply and demand arbitration device receives through said supply and demand arbitration terminals a request from said consumers to change said reducible energy amount.

5. The supply and demand adjustment system according to claim 1, wherein said supply and demand arbitration device is further configured to collect said reducible energy amount additionally based on a content of said request from said supply and demand arbitration device before a time of execution of said reduction in energy usage by said consumers.

6. The supply and demand adjustment system according to claim 1, further comprising
a shared energy source shared between sharing consumers of said consumers, each of said sharing consumers being a member of a predefined community, wherein
said consumers are further configured to use said shared energy source to make appropriation to cover a shortage of said energy by paying a certain equivalent through said supply and demand arbitration terminals when reduction of said energy amount to be reduced given in said replies to said supply and demand arbitration device is not feasible, and
said shortage of said energy corresponds to a difference between said energy amount given in said replies to said supply and demand arbitration device and an actually reducible amount of said energy.

7. The supply and demand adjustment system according to claim 6, wherein said consumers are further configured to determine cost-effectiveness to be achieved by the presence or absence of said appropriation based on an energy amount available for appropriation notified from a control terminal of said shared energy source through said supply and demand arbitration terminals and a unit price of said energy amount.

8. The supply and demand adjustment system according to claim 1, wherein said supply and demand arbitration device summarizes said reducible energy amount from said consumers and an accuracy of achievement in replies through said supply and demand arbitration terminals.

9. A supply and demand adjustment system to make supply and demand adjustment of energy, comprising:
a supply and demand adjustment device provided on a supply side of said energy, the supply and demand adjustment device making a request of a target reduction value for a reduction in energy usage by consumers;
supply and demand arbitration terminals provided on a side of said consumers; and
a supply and demand arbitration device connected to said supply and demand adjustment device and said supply and demand arbitration terminals through a communication network in a manner that enables bidirectional communication therebetween, the supply and demand arbitration device
working cooperatively with said supply and demand adjustment device to determine an incentive target value and an adjustment range of the incentive target value, the incentive target value being determined using one or more predictions of an amount of the reduction in energy usage by the consumers corresponding to one or more proposed values of the incentive target value, the predictions and the proposed values being communicated between the supply and demand adjustment device and the supply and demand arbitration device over the communication network, and the incentive target value being a target value of an incentive to said consumers relating to said target reduction value requested by said supply and demand adjustment device,
working cooperatively with said supply and demand arbitration terminals to adjust the incentive target value within the adjustment range, and the incentive target value being adjusted using a summarized amount representing an amount of reducible energy indicated by said consumers in response to the incentive target value, wherein the incentive target value is adjusted by
making, through said supply and demand arbitration terminals, respective requests to said consumers, each request indicating to a consumer the incentive target value and requesting in response to the incentive target value an amount of reducible energy by the consumer,
receiving, through said supply and demand arbitration terminals, respective replies from said consumers in response to the requests to said consumers, each reply by a consumer indicating the amount of reducible energy by the consumer in response to the incentive target value, and
summarizing the amounts of reducible energy by said consumers to generate the summarized amount, and
transmitting the summarized amount to said supply and demand adjustment device, wherein
said supply and demand adjustment device and said supply and demand arbitration device are configured to change said target reduction value for the reduction in the energy usage by the consumers dynamically while changing said incentive target value.

10. A supply and demand adjustment system to make supply and demand adjustment of energy, comprising:
a supply and demand adjustment device provided on a supply side of said energy, the supply and demand adjustment device making a request of a target reduction value for a reduction in energy usage by consumers;
supply and demand arbitration terminals provided on a side of said consumers; and
a supply and demand arbitration device connected to said supply and demand adjustment device and said supply and demand arbitration terminals through a communication network in a manner that enables bidirectional communication therebetween, the supply and demand arbitration device
working cooperatively with said supply and demand adjustment device to determine an incentive target value and an adjustment range of the incentive target value, the incentive target value being determined using a predefined feedback sequence that provides feedback to the supply and demand adjustment device, the feedback including predictions relating to an amount that said consumers will reduce energy usage in response to values proposed for the incentive target value, the predictions being generated by the supply and demand arbitration device using empirical information representing a demand of said consumers for energy usage, and the incentive target value being a target value of an incentive to said consumers relating to the target reduction requested by said supply and demand adjustment device, working cooperatively with said supply and demand arbitration terminals to adjust the incentive target value within the adjustment range using another predefined feedback sequence that provides to the supply and demand arbitration device another feedback, which includes a summarized amount representing an amount of energy usage that said consumers indicated be willing to reduce upon a value the of the incentive to said consumers being equal to the incentive target value, and the predefined feedback sequence includes that the supply and demand arbitration device performs making, through said supply and demand arbitration terminals, respective requests to said consumers, each request indicating to a consumer the incentive target value and requesting in response to the incentive target value an amount of reducible energy by the consumer, receiving, through said supply and demand arbitration terminals, respective replies from said consumers in response to the requests to said consumers, each reply by a consumer indicating the amount of reducible energy by the consumer in response to the incentive target value, and summarizing the amounts of reducible energy by said consumers to generate the summarized amount, and transmitting the summarized amount to said supply and demand adjustment device, wherein said supply and demand adjustment device and said supply and demand arbitration device are configured to change said target reduction value for the reduction in the energy usage by the consumers dynamically while changing said incentive target value.

* * * * *